United States Patent [19]

Distel et al.

[11] Patent Number: 4,698,966

[45] Date of Patent: Oct. 13, 1987

[54] METHOD AND APPARATUS FOR REGENERATING A SOOT FILTER OF INTERNAL COMBUSTION ENGINES

[75] Inventors: Robert Distel, Munich; Peter Kugland, Friedberg, both of Fed. Rep. of Germany

[73] Assignee: Bayerische Motoren Werke Aktiengesellschaft, Munich, Fed. Rep. of Germany

[21] Appl. No.: 589,647

[22] Filed: Mar. 14, 1984

[30] Foreign Application Priority Data

Mar. 18, 1983 [DE] Fed. Rep. of Germany ....... 3309892

[51] Int. Cl.⁴ .............................................. F01N 3/02
[52] U.S. Cl. ........................................ 60/274; 60/286
[58] Field of Search ......................... 60/274, 286, 311

[56] References Cited

U.S. PATENT DOCUMENTS 4,335,574  6/1982  Sato .......................................... 55/283
4,509,327  4/1985  Enga ......................................... 60/274
4,551,703  11/1985  Bourauel .............................. 340/52 D Primary Examiner—Douglas Hart

[57] ABSTRACT

A method for regenerating a soot filter of internal combustion engines, especially of diesel intenal combustion engines, and apparatus for carrying out the method in which a soot burning-off operation if initiated in predetemined intervals; the intervals are determined by an operating parameter of the internal combustion engine itself which results from the sum of a characteristic magnitude variable toward both sides.

5 Claims, 1 Drawing Figure

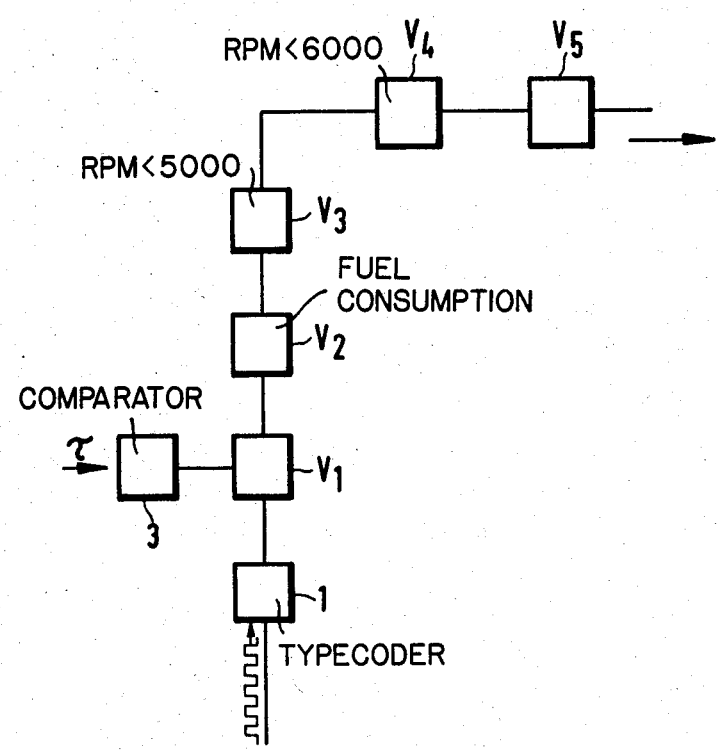

METHOD AND APPARATUS FOR REGENERATING A SOOT FILTER OF INTERNAL COMBUSTION ENGINES

The present invention relates to a method for regenerating a soot filter of internal combustion engines, especially of diesel internal combustion engines, in which burning-off operation of soot is initiated at predetermined intervals.

Such a method is disclosed in the German Offenlegungsschrift No. 25 19 609. The counter pressure occurring at the soot filter, or the service life, respectively, operating time of the internal combustion engine is thereby determinative for the initiation of the operation burning-off the soot. Both possibilities take into consideration completely inadequately the actual soot load or charge of the soot filter, since in both cases the exhaust gas rate respectively quantity which is dependent on the use conditions of the internal combustion engine, is not taken into consideration. Therebeyond, the determination of the differential pressure requires an engagement at the soot filter and entails the danger that the pressure lines leading to the corresponding measuring apparatus become clogged up and therefore influence negatively the measurement result.

It is therefore an object of the present invention to provide a method of the aforementioned type which, without engagement at the soot filter, enables an aimed-at initiation of the burning-off operation on the basis of a precise indication concerning the actual soot load or charge of the soot filter.

The underlying problems are solved according to the present invention in that the spacings or intervals are determined by an operating parameter of the internal combustion engine itself, which results from the sum of a characteristic magnitude variable toward both sides.

The invention is based on detecting the load or charge of the soot filter indirectly by integration of the load of the internal combustion engine itself. It is predicated on the consideration that, at least on the average, the soot yield, that is the soot rate, is approximately proportional to the instantaneous load of the internal combustion engine.

The load of the internal combustion engine can be determined in different ways, as known to those skilled in the art. One of the possibilities is to equate the operating parameter reflecting the load to the overall quantity of the consumed fuel. This concept is disclosed already in the German Offenlegungsschrift No. 31 04 174 for a service-interval-indicating installation of internal combustion engines. However, in contrast to this prior art installation, the regeneration of a soot filter takes place automatically in the present invention and without the possible interaction of the vehicle driver.

In the alternative, the operating parameter may also be the overall number of the rotations of the output shaft or of another rotating part of the internal combustion engine itself. This concept is also already known for a service-interval-indicating installation (compare German Offenlegungsschrift No. 31 14 689).

The two aforementioned Offenlegungschriften, the subject matter of which is expressly incorporated herein by reference, provide control realization possibilities for the method according to the present invention. Furthermore, the realization of a further refinement of the inventive concept can also be seen from the same. This refinement resides in taking into consideration extreme load values of the internal combustion engine with a relatively high soot exhaust by a load-dependent component in addition to the actual component. In such extreme cases, the additional component is therefore determined by calculation and is added to the actual component. As a result thereof, the operating parameter, at which the regeneration is undertaken, is attained relatively more rapidly and the regenerating is thus carried out at relatively shorter intervals.

The additional load-dependent component can be determined in conjunction with the actual component in such a manner that the contribution to the operating parameter which consists of the actual and of the load dependent component, is obtained by multiplication of the actual component with a factor. In addition to this multiplicative determination the additional component may also be taken into consideration additively in the form of a predetermined constant value or of a value related to the duration respectively magnitude of the extreme load.

These and other objects, features and advantages of the present invention will become more apparent from the following description when taken in connection with the accompanying drawing, which shows, for purposes of illustration only, one embodiment in accordance with the present invention, and wherein:

The single FIGURE is a schematic block diagram of a circuit arrangement in accordance with the present invention.

Referring now to the single FIGURE of the drawing, the circuit arrangement illustrated therein permits the realization of a method for regenerating a soot filter of internal combustion engines. The burning-off operations of the soot collected in the filter are initiated in predetermined intervals and as a function of an operating parameter which results from the summation of characteristic magnitudes of the internal combustion engine.

The characteristic magnitude is the instantaneous number of rotations of the output shaft which is weighted corresponding to the load of the internal combustion engine.

Pulses corresponding to the number of rotations of an output shaft are applied to the circuit arrangement of the single FIGURE. These pulses reach a input attenuator $V_5$ by way of a type-coder element 1, by means of which different types of internal combustion engines can be taken into consideration, and by way of input attenuators $V_1$ to $V_4$. The input attenuator $V_1$ takes into consideration an extreme loading of the internal combustion engine as a result of a low temperature of an operating liquid such as, for example, the engine oil. For that purpose, the output signal of an engine oil temperature pick-up (not shown) is fed to a comparator 3 which produces an output signal below a predetermined temperature of, for example, 320 K and then turns off the input attenuator $V_1$. This means that the input attenuator $V_1$ is effective above this temperature and then reduces the number of the pulses applied to the input attenuator $V_2$.

The input attenuator $V_2$ takes into consideration the fuel consumption rate and remains engaged as long as this rate lies below a predetermined value.

The input attenuators $V_3$ and $V_4$ take into consideration a load of the internal combustion engine by reference to the rotational speed of the output shaft or of a rotating part itself. The input attenuator $V_3$ remains turned on for such length of time until a predetermined limit rotational speed of, for example, 5000 rpm has not yet been reached. The input attenuator $V_4$ remains effective for such period of time until the rotational speed exceeds a second, higher limit value of, for example, 6000 rpm. The input attenuators $V_3$ and $V_4$ thus take into consideration differently high rotational speeds.

The duration of the inactivity of the input attenuators $V_1$ to $V_4$ can be selected for such length of time as the extreme load condition of the vehicle engine which is being considered, continues. Alternatively, the duration can be set for a predetermined period of time such as the time necessary for a predetermined number of engine revolutions. For that purpose, conventional timing elements, for example, pulse counters operable for the number of rotations may be used which determine the duration of the inactivity of the input attenuators.

The input attenuator $V_5$ supplies for a predetermined number of revolutions of, for example, $1 \times 10^4$, an output signal for a conventional regeneration installation (not shown) of a soot filter (also not shown) of an internal combustion engine. Insofar as only non-extreme loads of the internal combustion engines have occurred and therefore all input attenuators $V_1$ to $V_4$ were effective, this value corresponds exactly to the fraction of the actual total number of rotations which results from the circuit connection of the input attenuators $V_1$ to $V_5$. In the normal case, in contrast thereto, the actual total number of rotations is reduced compared to this ideal total number of rotations corresponding to the load factors given by the input attenuators $V_1$ to $V_4$. The ratio of the total number calculated with the aid of the input attenuators $V_1$ to $V_4$ and the actual total number is the larger the greater the load of the internal combustion engine.

In lieu of taking into consideration the total number of rotations of a rotating part of the internal combustion engine, also the traveled distance can be used as the basis which is added corresponding to the respectively engaged transmission speed since the latter is then at a direct constant ratio to such a total number of rotations.

A further alternative of the present invention resides in taking into consideration as operating parameter the total fuel consumption of the internal combustion engine. The fuel consumption rate, possibly weighted corresponding to the load of the internal combustion engine, is thereby added and upon reaching the predetermined value a burning-off operation is initiated.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A method for regenerating a soot filter of internal combustion engines, in which a soot burning-off operation is automatically initiated in predetermined intervals, comprising the step of sensing the total number of rotations of a rotating part of the internal combustion engine and controlling the time of initiation of the burning operation in predetermined proportion to the sensed number of rotations and further comprising the additional step of sensing a load-dependent signal of the internal combustion engine and gradually modifying the initiation time of the burning operation in response to a predetermined value of the load-dependent condition.

2. A method according to claim 1, wherein the modification is obtained by a multiplication of the controlling effect of the number of revolutions by the load-dependent factor.

3. A method according to claim 1, wherein the load-dependent factor is the overall quantity of the consumed fuel.

4. A method according to claim 1, wherein the load-dependent factor is a temperature of an operating liquid in the engine.

5. A method according to claim 1, wherein the load-independent factor is the total number of rotations of a rotating part of the internal combustion engine.

* * * * *